(12) United States Patent
Maguire et al.

(10) Patent No.: US 7,308,977 B2
(45) Date of Patent: Dec. 18, 2007

(54) CLUTCH ASSEMBLY AND METHOD OF REVERSING COOLING FLUID FLOW

(75) Inventors: Joel M. Maguire, Northville, MI (US); Paul D. Stevenson, Ann Arbor, MI (US); Paula J. Armstrong, Canton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 266 days.

(21) Appl. No.: 11/137,824

(22) Filed: May 25, 2005

(65) Prior Publication Data

US 2006/0266614 A1 Nov. 30, 2006

(51) Int. Cl.
*F16D 25/0638* (2006.01)
*F16D 13/72* (2006.01)

(52) U.S. Cl. .............................. 192/85 AA; 192/70.12; 192/113.35

(58) Field of Classification Search ........... 192/113.35, 192/113.36
See application file for complete search history.

(56) References Cited

U.S. PATENT DOCUMENTS

| 5,755,314 A | * | 5/1998 | Kanda et al. | ............ 192/70.12 |
| 2004/0069586 A1 | * | 4/2004 | Sasse | ....................... 192/70.12 |
| 2005/0158170 A1 | * | 7/2005 | Aschauer | ..................... 415/176 |

* cited by examiner

*Primary Examiner*—Richard M Lorence

(57) ABSTRACT

A clutch assembly for a transmission having a pressurized fluid source includes selectively engageable clutch plates including an apply plate. A piston is movable between an apply position and a release position to respectively engage or release the clutch plates. An apply plate cover cooperates with the apply plate to at least partially form an annular cavity that is sealed to contain pressurized fluid provided by the pressurized fluid source when the piston is moved to the apply position, thereby allowing pressurized fluid flow radially inward across the engaged clutch plates. The annular cavity is opened to allow fluid to empty therefrom when the piston is moved to the released position, thereby allowing centrifugally pumped fluid to flow radially outward across the released clutch plates. A method of reversing cooling fluid flow across clutch plates is also provided.

19 Claims, 5 Drawing Sheets

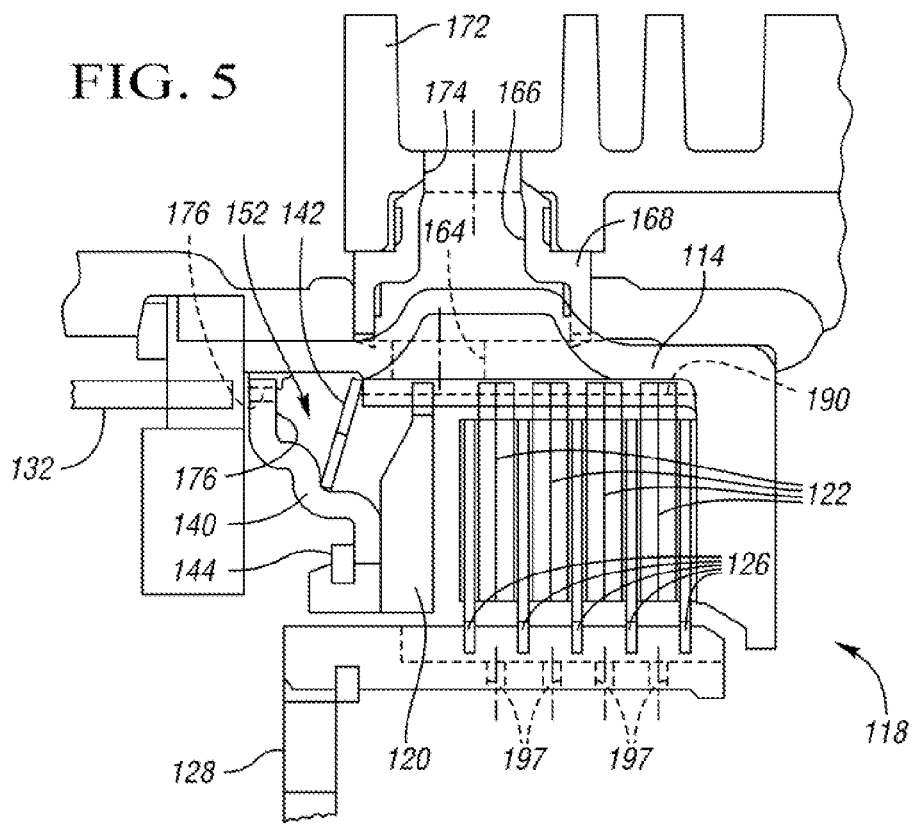
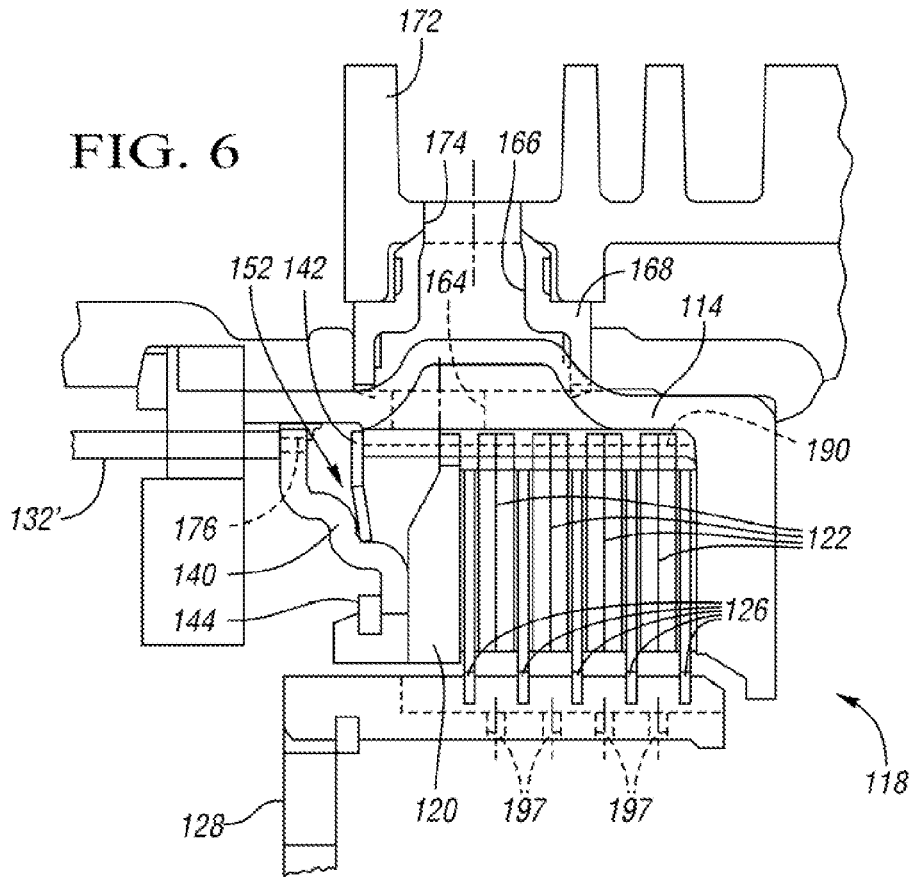

CLUTCH ASSEMBLY AND METHOD OF REVERSING COOLING FLUID FLOW

TECHNICAL FIELD

The invention relates to a transmission clutch and a method of reversing the direction of cooling fluid flow therethrough.

BACKGROUND OF THE INVENTION

Heat dissipation in transmission friction clutches is critical to clutch longevity. Wet friction clutches employ cooling fluid that is passed over the clutch plates to draw heat away. Fluid cooling may be accomplished by pressurized fluid flow (e.g., fluid directed from a pump) or centrifugal splash cooling. Spin losses and pumping losses must be minimized.

SUMMARY OF THE INVENTION

A clutch assembly for a transmission is provided that allows efficient cooling of clutch plates for component longevity, while minimizing spin losses and pumping losses. The clutch assembly allows optimal clutch cooling by reversing fluid flow: fluid flows radially outward during clutch release for efficient spin loss cooling and is pumped radially inward for optimal distribution of cooling fluid flow during clutch apply.

Accordingly, a clutch assembly for a transmission having a pressurized fluid source includes selectively engageable clutch plates including an apply plate. A piston is movable between an apply position and a release position to respectively engage or release the clutch plates. An apply plate cover cooperates with the apply plate to at least partially define an annular cavity that is sealed to contain pressurized fluid when the piston is moved to the apply position, thereby allowing circumferential distribution of pressurized fluid that can flow radially inward across the engaged clutch plates. The annular cavity is opened to allow fluid to empty therefrom when the piston is moved to the release position, thereby allowing splashed fluid to be centrifugally pumped by rotation of the plates to flow radially outward across the released clutch plates.

Various embodiments of the clutch assembly achieve the reverse fluid flow cooling. For instance, the apply plate cover may have a cover opening through which the pressurized fluid in the annular cavity empties when the piston moves to the release position. The cover opening may be positioned so that the piston blocks the cover opening when the piston is moved to the apply position and unblocks the cover opening when the piston is moved to the release position.

Alternatively, an apply plate cover with a cover opening may include a flapper valve hinged at the cover opening. The flapper valve is closed by the piston to block the cover opening, thereby sealing the annular cavity when the piston is moved to the apply position. The flapper valve is then opened to unblock the cover opening and thereby allow fluid to empty from the annular cavity when the piston is moved to the release position.

In still another embodiment, the cover opening may be in a portion of the apply plate cover that seals against an adjacent portion of the apply plate when the piston is moved to the apply position. The sealed apply plate cover and apply plate thereby prevent emptying of fluid through the cover opening.

In still another embodiment, rather than an opening in the apply plate cover, there may be an opening in the apply plate. In that instance, pressurized fluid in the annular cavity is emptied through the apply plate opening when the piston is moved to the release position. In this embodiment, the apply plate cover moves relative to the apply plate to block the apply plate opening when the piston moves to the apply position.

Within the scope of the invention, a transmission includes a pressurized fluid source and a stationary member with a radial opening and an axial passage. Preferably, multiple axial passages are circumferentially spaced about the stationary member. A rotatable member has a radial opening and has friction plates splined thereto. Preferably, multiple circumferentially-spaced radial openings are formed in the rotatable member. Reaction plates are splined to the stationary member. A piston moves between an apply position and a release position to respectively engage or release the clutch plates. An apply plate cover cooperates with an apply plate to at least partially define an annular cavity. The annular cavity is sealed when the piston moves to the apply position, which allows pressurized fluid to flow through the stationary member radial opening, to the annular cavity, through the axial passages and then radially inward through grooves across the engaged plates. The annular cavity is opened to allow centrifugally pumped fluid to flow through the stationary member radial opening, radially outward through grooves across the released clutch plates, through the axial passages and to the annular cavity to empty therefrom. The reaction of the grooved plates provides a centrifugal pumping to force the fluid outward. The splashed fluid mixes with air to minimize spin losses during the radially outward flow across the clutch plates.

In one aspect of the invention, a valve is controllable to open the feed to the stationary member radial opening and thereby permit pressurized fluid flow therethrough when the piston is moved to the apply position. The valve blocks the stationary member radial opening to prevent fluid flow therethrough when the piston is moved to the release position.

A method of providing cooling fluid flow across clutch plates in a transmission includes engaging the clutch plates and pumping fluid radially inward across the engaged plates. The method further includes releasing the clutch plates and centrifugally pumping splashed fluid such that it flows radially outward across the released plates. Preferably, the centrifugally pumping step is via grooves in the rotating clutch plates.

In one aspect of the invention, the engaging step may include moving a piston in one direction to thereby seal an annular cavity between an apply plate cover and an apply plate. The pumping fluid radially inward step may include pumping fluid through the sealed annular cavity. The releasing step may include moving the piston in an opposing direction to thereby open the annular cavity and release the clutch plates. The method then includes emptying the fluid from the opened annular cavity.

The method may include opening the valve described above to permit pressurized fluid flow across the engaged clutch plates when the piston is moved to seal the cavity, and closing the valve to prevent pressurized fluid flow across the released clutch plates when the piston is moved to open the annular cavity.

When a clutch assembly as described above is used, having an apply plate cover with a cover opening, the moving the piston in one direction step may further include blocking the cover opening and the moving the piston in the opposing direction step may further include unblocking the cover opening.

When a clutch assembly embodiment is provided with an apply plate having an opening, the moving the piston in one direction step may include sealing the apply plate cover and the apply plate together to block the apply plate opening and the moving the piston in the opposing direction step may further include unsealing the apply plate cover and apply plate from one another to unblock the apply plate opening when the piston is moved in the opposing direction.

In an embodiment having some clutch plates (such as reaction plates) splined to a stationary member and other clutch plates (such as friction plates) splined to a rotatable member, the method may include providing axial passages in the stationary member to facilitate equal fluid flow to the exterior of all friction plates. These axial passages are preferably formed by missing clutch teeth on the reaction plates. The method may further include providing openings in a rotatable member. The pumping step may then include pumping fluid from the annular cavity, through the axial passages, across the clutch plates and through the rotatable member openings.

In one aspect of the invention, the centrifugally pumping step may include routing splashed fluid radially outward through the rotatable member openings, across the clutch plates, through the axial passage and through the open annular cavity.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 5 is a fragmentary cross-sectional view of a second embodiment of a launch clutch assembly with a piston in a release position and including an opening in an apply cover plate;

FIG. 6 is a fragmentary cross-sectional view of the embodiment of FIG. 5 with the piston in an apply position blocking the opening with the piston sealing the hole in the apply plate cover;

DESCRIPTION OF THE PREFERRED EMBODIMENTS

A clutch assembly is provided that allows reversal of fluid flow to minimize spin losses during clutch release while providing efficient cooling during clutch engagement. By defining an annular cavity that can be sealed during clutch engagement to allow pressurized flow radially inward across the engaged clutch plates, improved distribution of cooling oil across the clutch plates is achievable. By allowing the annular cavity to be opened and the pressurized fluid feed blocked when the plates are released, centrifugally pumped fluid can be directed across the plates to allow a mixture of fluid and air, which minimizes spin losses during clutch release.

Figure 1:
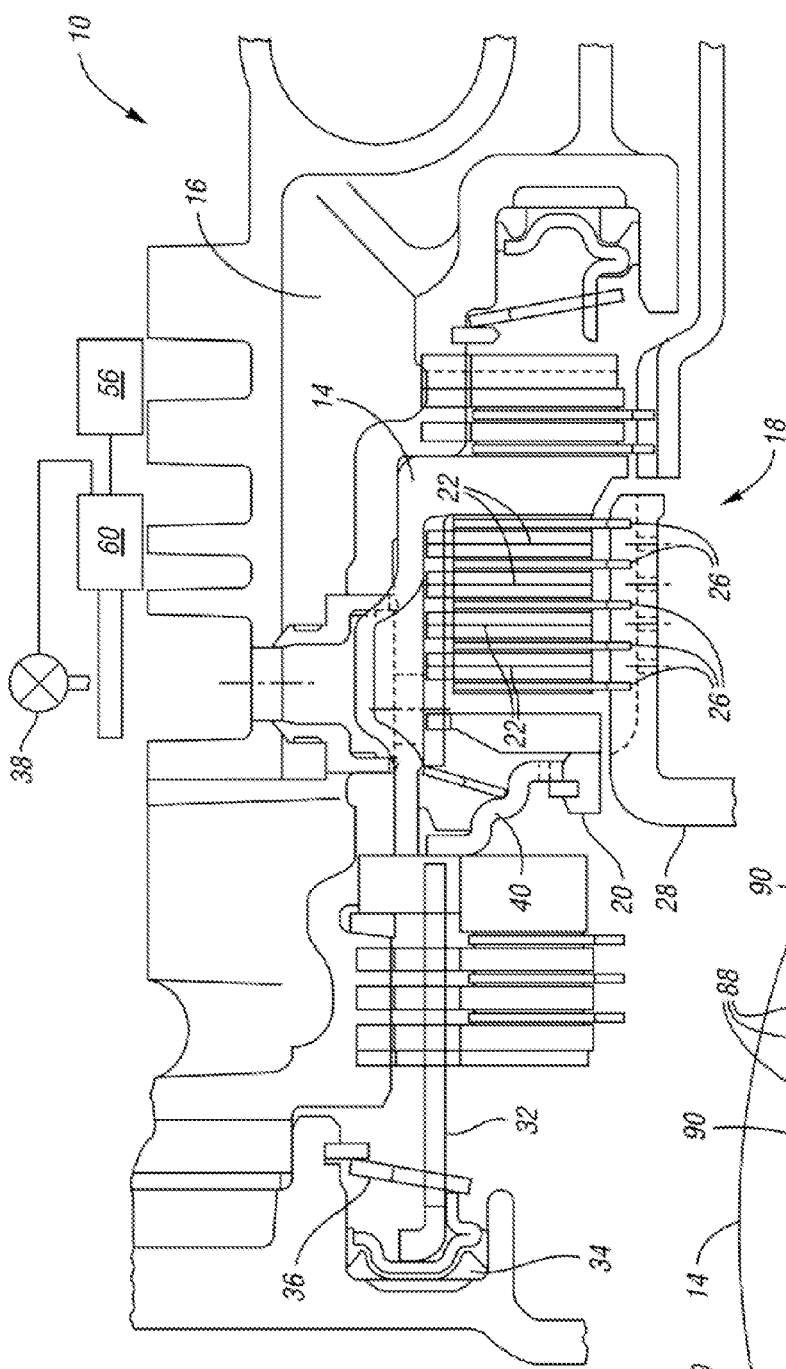
FIG. 1 is a fragmentary cross-sectional view of a transmission including a first embodiment of a launch clutch assembly having a piston in a release position and an apply plate cover with an opening.

Referring to FIG. 1, a portion of a transmission 10 is illustrated. The transmission 10 includes a stationary member 14 connected to a casing 16 that generally surrounds the transmission 10. The casing 16 may be one component or several components. A clutch assembly 18 includes various clutch plates including a movable apply plate 20, reaction plates 22 which are splined to the stationary member 14, and friction plates 26 splined to a rotatable member 28. The reaction plates 22 and friction plates 26 are alternately distributed adjacent to one another. The rotatable member 28 is preferably a clutch hub that is continuously connected with a member of a planetary gear set, such as a carrier member, as is known in the art. By engaging the friction plates 26 with the reaction plates 22 in the manner discussed below, the rotatable member 28 is grounded to the stationary member 14. Preferably, the clutch assembly 18 is a launch clutch and grounding of the rotatable member 28 allows the stationary member 14 to provide reaction torque during launch of the transmission 10.

An apply piston 32 is generally axially movable between a release position (shown in FIG. 1) and an apply position (shown and discussed with respect to FIG. 3 below) to respectively release or engage the friction plates 26 with the reaction plates 22. The apply piston 32 is movable between the release position shown in FIG. 1 and an apply position (wherein the piston is denoted as 32', shown in FIG. 3) by selectively filling a piston cavity 34 with hydraulic fluid from a fluid source such as a pump 38 in fluid communication with the piston cavity 34 (fluid communication not shown) as is well understood by those skilled in the art. A piston spring 36 biases the apply piston 32 in the release position.

A generally annular apply plate cover 40 is positioned between the piston 32 and the apply plate 20. As will be understood by those skilled in the art, the clutch plates 22, 26, the apply plate 20, the apply plate cover 40 and the rotatable member 28 are generally annular, centered about a center axis of the transmission (not shown). As better illustrated in FIG. 2, the apply plate cover 40 is biased axially away from the apply plate 20 by a cover bias spring 42. A retaining ring 44 acts as a stopper to stop axial travel of the apply plate cover 40 away from the apply plate 20. A lip seal 48 is connected at a radial outer portion of the apply plate cover to seal the cover 40 to the stationary member 14.

The apply plate cover 40, the apply plate 20 and the stationary member 14 form a generally annular cavity 52 therebetween. The apply plate cover spring 42 is disposed within the generally annular cavity 52.

Referring again to FIG. 1, a control unit 56 is in signaling communication with a solenoid valve 60. As may be better seen in FIG. 2, the stationary member 14 is formed with a radial opening 64 that is in fluid communication with a radial opening 66 in a fluid transfer seal member 68 disposed in a radial opening 70 in the transmission casing 16. A valve body 72 is attached to the transmission casing 16 and is formed with a radial opening 74 that is in fluid communication with the radial openings 66 and 64 of the seal member and the stationary member 14, respectively. The valve body 72 houses the solenoid valve 60, as is known in the art.

Figure 2:
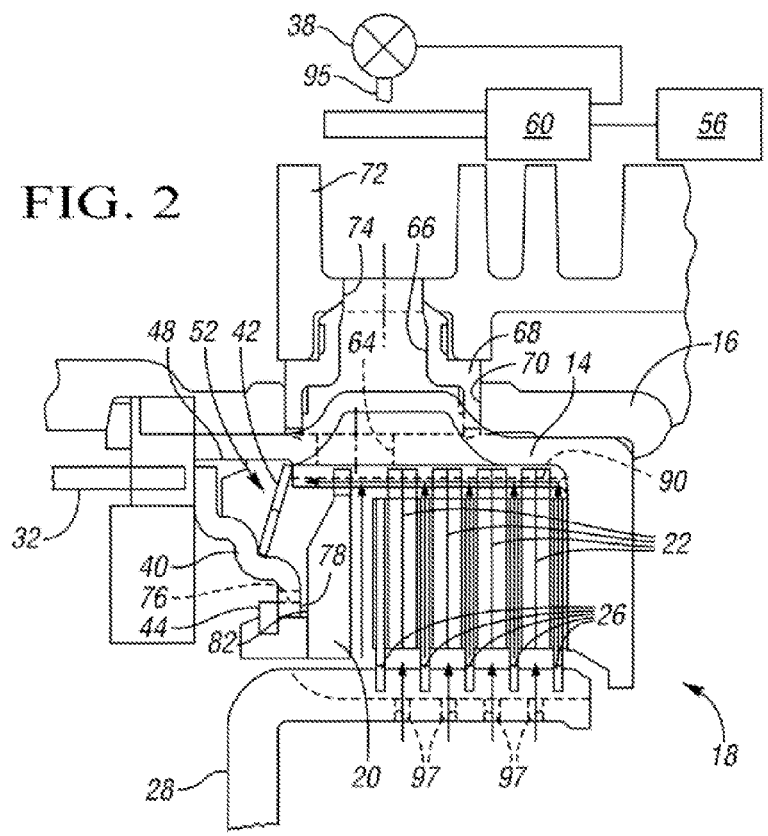
FIG. 2 is a fragmentary cross-sectional view of the first embodiment of the launch clutch assembly of FIG. 1 with the piston in the release position.
Figure 3:
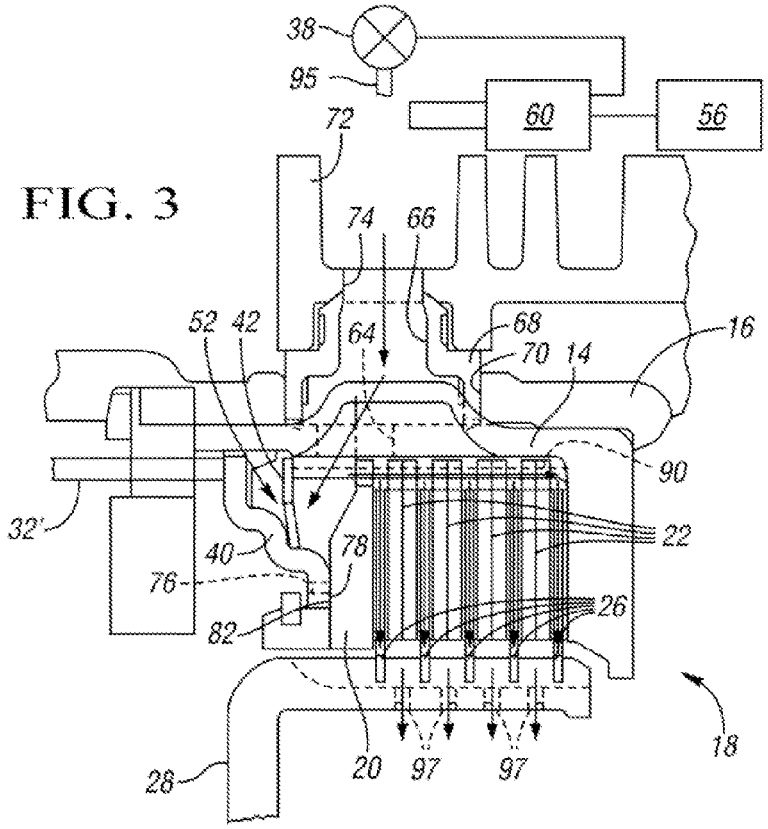
FIG. 3 is a fragmentary cross-sectional view of the launch clutch assembly of FIGS. 1 and 2 with an apply plate cover sealed to the apply plate and the piston in an apply position.

In one embodiment, shown in FIGS. 2 and 3, the apply plate cover 40 is formed with a generally axial opening 76 (or, alternatively, the opening 76 is machined in the apply plate cover 40). The axial opening 76 is in an inner radial portion 78 of the apply plate cover 40. When the piston 32 is in the release position of FIG. 2, the inner radial portion 78 does not abut an adjacent radial portion 82 of the apply plate 20. That is, the apply plate cover spring 42 biases the apply plate cover 40 away from the apply plate 20, there being enough axial travel permitted between the retaining ring 44 and the radial portion 82 of the apply plate 20 such that the inner radial portion 78 of the apply plate cover 40 does not seal against the inner radial portion 82 of the apply plate 20. Thus, fluid in the annular cavity 52 may empty through the axial opening 76 when the piston 32 is in the release position.

Figure 9:
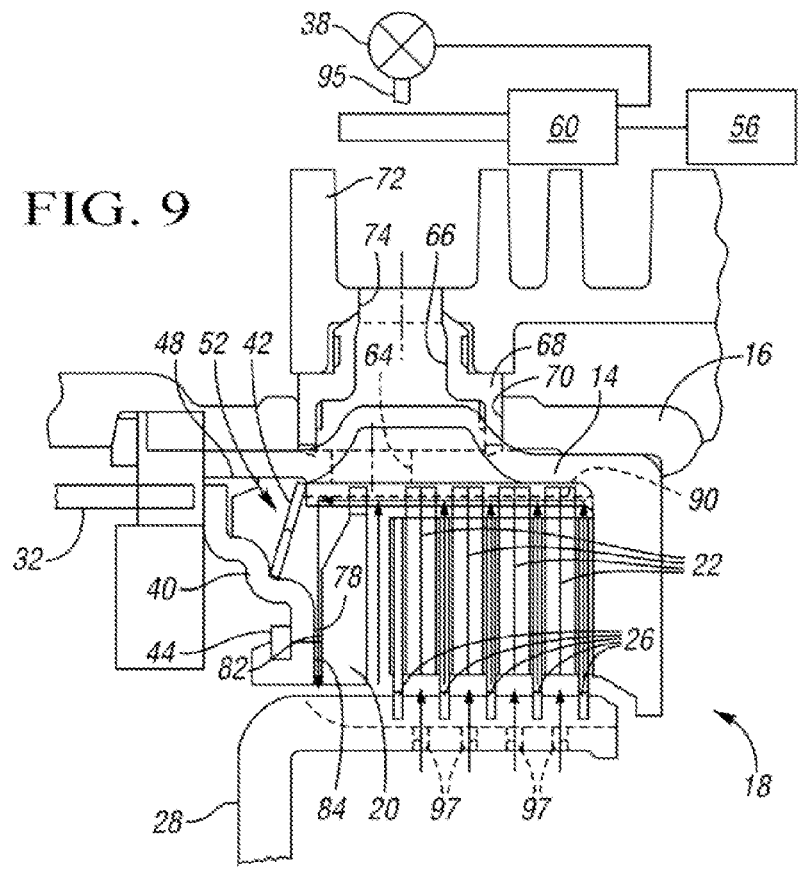
FIG. 9 is a fragmentary cross-sectional view of a fourth embodiment of a launch clutch assembly with an apply plate cover having an axial opening and with the piston in a release position.
Figure 10:
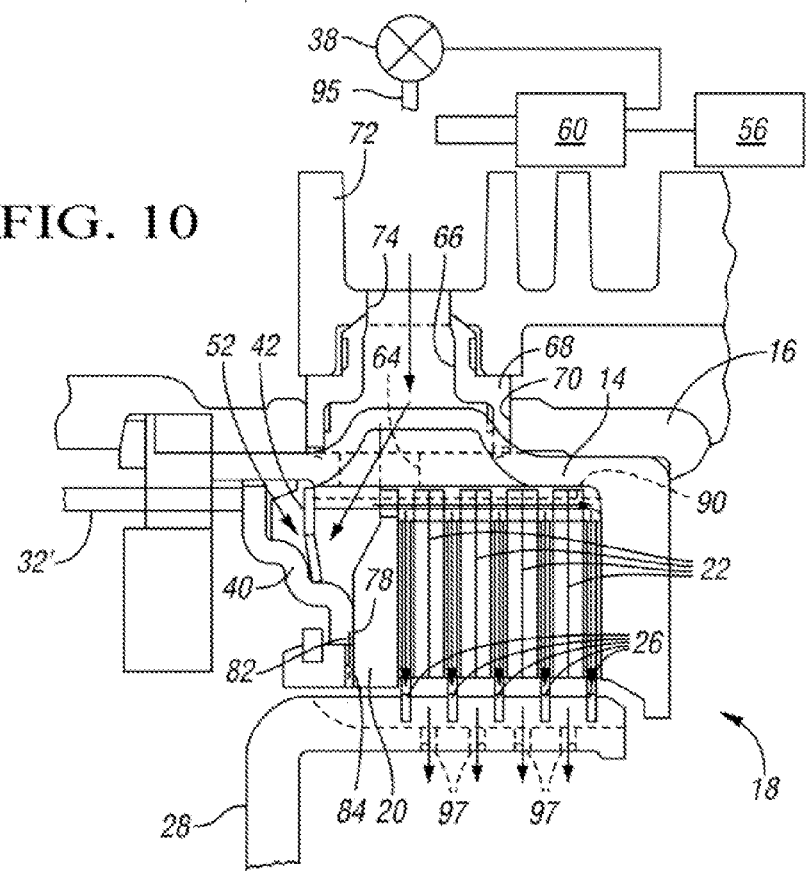
FIG. 10 is a fragmentary cross-sectional view of the launch clutch assembly of FIG. 9 with the piston in an apply position.

In another alternative embodiment, shown in FIGS. 9 and 10, instead of the axial opening 76 in the apply plate cover 40, a generally radial opening 84 may be formed in the apply plate 20. When the piston 32 is in the release position, the apply plate cover 40 is biased away from the apply plate 20 by the apply plate cover spring 42 so that the radial opening 84 is in fluid communication with the annular cavity 52 to allow fluid to empty from the cavity 52 through the radial opening 84.

Figure 4:
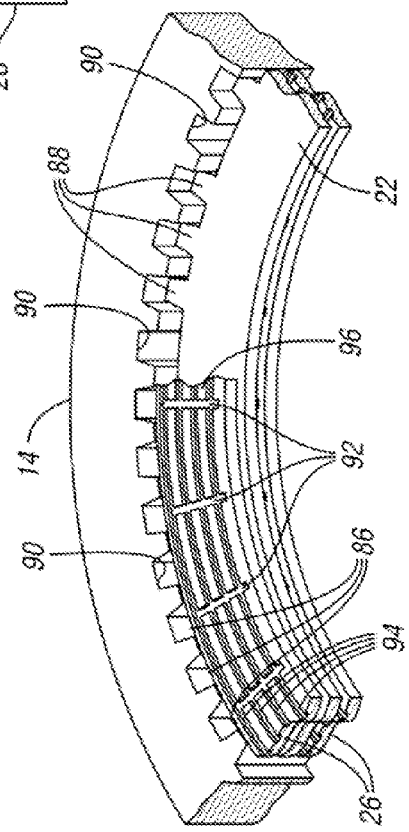
FIG. 4 is a fragmentary perspective view of a stationary member of a launch clutch assembly having axial passages via missing spline teeth.

As best shown in FIG. 4, the reaction plates 22 are formed with circumferential teeth 86 which are splined to the stationary member 14 at mating teeth 88 of the stationary member 14. Intermittent ones of the reaction plate teeth 86 are missing to form axial passages 90 at the interface of the stationary member 14 and the reaction plates 22. As also shown in FIG. 4, the friction plates 26 may be formed with radial grooves 92 and optional circumferential grooves 94 which intersect the radial grooves 92 to form a web for distribution of lubricating fluid across the face 96 of the friction plate 22 and an adjacent reaction plate 22 (the face of the lower friction plate 26 in FIG. 4 has an adjacent reaction plate 22). Other groove patterns may also be employed, as is known in the art. The uppermost friction plate 26 in FIG. 4 is shown in fragmentary view to better illustrate the underlying reaction plate 22 splined to the stationary member 14.

Referring again to FIG. 2, one of the axial passages 90 is indicated by the dashed line running axially across the stationary member 14 near the outer radial end of the splined reaction plates 22. The rotatable member 28 is formed with spaced radial openings 97 aligned with the reaction plates 22 and friction plates 26.

When the friction plates 26 are not engaged with the reaction plates 22, it is desirable to cool the plates 22, 26 in a manner that will minimize spin losses. This is accomplished by minimizing drag of fluid between the plates by cooling the plates 22, 26 from fluid splashed radially-outward, such that the fluid mixes with air in the gaps between the released plates 22, 26 and the rotation of the grooved friction plate 26 centrifugally pumps the fluid radially outward and through axial passages 90 into annular cavity 52 faster than the fluid is fed through radial openings 97. A variety of rotating components within the transmission 10 will cause centrifugal force to throw unpressurized fluid outward. The radially-outward cooling is accomplished by the rotatable member catching the thrown fluid, which then flows radially outward through the radial openings 97, continues radially outward across adjacent faces of the clutch friction plates 26 and reaction plates 22 (e.g., through the radial and circumferential grooves 92, 94 of FIG. 4) at which point the fluid encounters the axial passages 90 of the stationary member 14 and flows through the passages 90 toward the annular cavity 52. The fluid is then exhausted through the apply plate cover axial opening 76 (or, if the alternative design of the apply plate 20 is employed (see FIGS. 9 and 10), through the unblocked radial opening 84 in the apply plate 20 under pressure from the centrifugal pumping action of grooves 92 in the friction plates 26 and returns to a sump (not shown). When the piston 32 is in the release position, the control unit 56 controls the valve 60 such that it blocks a feed passage 95 from the pump 38. Thus, the pump 38 is not in fluid communication with the radial openings 74, 66, 64, and pressurized fluid may not enter the annular cavity 52. The clutch assembly 18 is thus not subjected to pressurized fluid from the pump when the piston 32 is in the release position.

Referring to FIG. 3, when the piston 32' is in the apply position, the friction plates 26 are engaged with the reaction plates 22 such that the rotatable member 28 is grounded to the stationary member 14 and the transmission casing 16. When the piston 32 is applied during launch, there is relative movement between the engaged plates 22, 26 until the clutch assembly 18 is fully applied, at which point there is no relative movement. Optimal cooling of the plates 22, 26 during launch may be achieved by applying pressurized fluid from an outside direction inward so that a more uniform distribution of oil is achieved across the plates 22, 26. In order to achieve a near equal pressurized distribution of oil across the plates 22, 26, it is necessary that the annular cavity 52 be sealed in the apply position of the piston 32'. As illustrated in FIG. 10, in the apply position, the apply plate cover 40 overcomes the bias of the apply plate cover spring 42 so that the radial portion 78 of the apply plate cover 40 seals against the radial portion 82 of the apply plate 20 and blocks the radial opening 84 in the apply plate 20. Referring to FIG. 3, (the alternative axial opening 76 in the apply plate cover 40 is also blocked when the piston 32' is in the apply position. Thus, the annular cavity 52 is sealed.

When the apply piston 32' is in the apply position, the control unit 56 concurrently controls the valve 60 such that it unblocks the feed passage 95 so that pressurized fluid from the pump is fed through the radial openings 74, 66, 64 of the valve body 72, the fluid transfer seal member 68 and the stationary member 14, respectively. The fluid then empties from the radial opening 64 into the sealed annular cavity 52. From the annular cavity 52, the fluid flows axially through the axial passages 90 such that it is put in fluid communication with the engaged faces of the adjacent reaction plates 22 and apply plates 26. The fluid then flows radially inward in the grooves 92 against centrifugal pressure across the plates 22, 26 and then through the radial openings 97 in the rotatable member 28 and on to the sump (not shown). Thus, the control unit 56 concurrently controls the valve 60 and the piston 32 to seal or open the annular cavity 52, respectively, when the plates 22, 26 are applied and released. This enables efficient, radially-outward cooling during release of the plates 22, 26 and pressurized, radially-inward cooling during launch and apply of the plates 22, 26.

Alternative embodiments exist for achieving the requisite sealed and opened annular cavity during clutch apply and release, respectively. Referring to FIGS. 5 and 6, an alternative embodiment of a clutch assembly 118 includes an apply plate cover 140 formed with an axial opening 176 near a radially outward portion of the apply plate cover 140. When an apply piston 132 is in the release position shown in FIG. 5, the opening 176 is unblocked so that an annular cavity 152 defined by a stationary member 114, an apply plate 120 and the apply plate cover 140 is open. Thus, radially-outward splash cooling of released friction plates 126 and reaction plates 122 may be accomplished through radial openings 197 in a rotatable member 128 across adjacent faces of the released plates 122, 126 (which may be formed with grooves such as those shown and described in FIG. 4 with respect to the embodiment of FIGS. 1-3). The fluid may then flow through axial passages 190 (one shown; formed via missing spline teeth in the reaction plates 122, as illustrated with respect to the stationary plates 22 of FIG. 4). The fluid then flows from the axial passages 190 to the open annular cavity 152 and is emptied through the opening 176. A control unit, valve and pump (not shown) such as those employed with respect to the embodiment of FIGS. 1-3 cooperate so that the valve blocks fluid flow from the pump through radial openings 174, 166, 164 in a valve body 172, a fluid transfer seal member 168, and a stationary member 114, respectively.

When the piston is in an apply position 132' shown in FIG. 6, the piston 132' blocks the opening 176 in the apply plate cover 140 to seal the annular cavity 152. At the same time, a control unit controls the valve to open fluid communication between the pump and the respective radial openings 174, 166, 164 of the valve body 172, fluid transfer seal member 168, and stationary member 114, to allow pressurized fluid flow therethrough to the sealed annular cavity 152. From the sealed annular cavity 152, fluid flows axially through the axial passages 190 and then radially inward across the adjacent faces of the plates 122, 126 and out through the radial openings 197 in the rotatable member 128.

In the embodiments of FIGS. 5 and 6, there is no relative axial movement between the apply plate cover 140 and the apply plate 120, as there is in the embodiment of FIGS. 1-3 in which the apply plate cover 40 must move axially with respect to the apply plate 20 in order to block or unblock the opening 76 in the apply plate cover 40. In the embodiment of FIGS. 5 and 6, the apply plate cover 140 is held firmly between the apply plate 120 and a retaining ring 144. Spring 142 biases the apply plate cover 140 and apply plate 120 in the release position.

Figure 7:
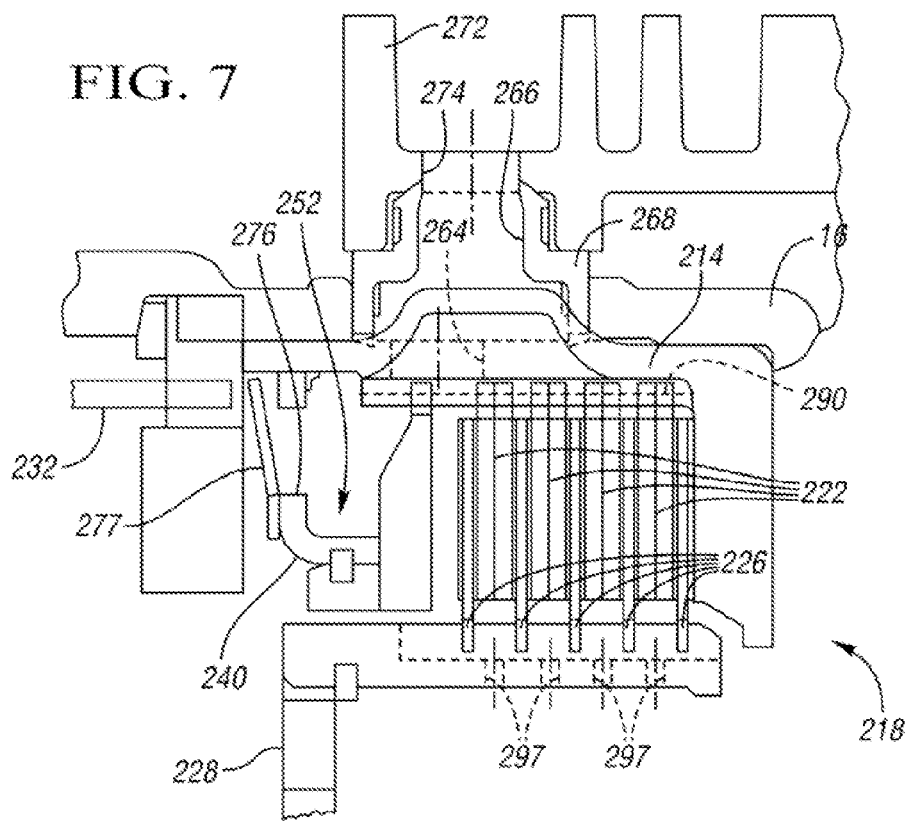
FIG. 7 is a fragmentary cross-sectional view of a third embodiment of a launch clutch assembly with an apply plate cover having an open flapper valve and a piston in a release position.
Figure 8:
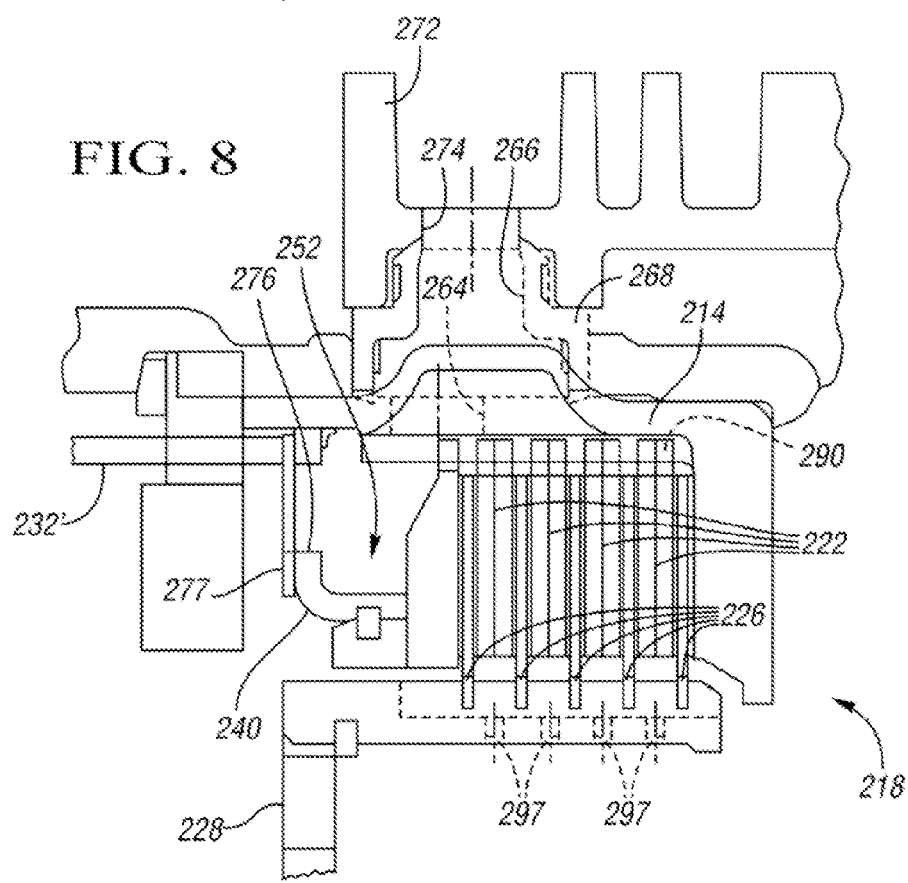
FIG. 8 is a fragmentary cross-sectional view of the launch clutch assembly of FIG. 7 with the piston in an apply position closing the flapper valve.

Referring to FIGS. 7 and 8, another alternative embodiment of a clutch assembly 218 involves an apply plate cover 240 having an opening 276 at which a hinged member 277, referred to herein as a flapper valve, is located. When a piston 232 is in a release position shown in FIG. 7, the flapper valve 277 is biased away from the opening 276 so that an annular cavity 252 remains open and the splash cooling radially-outward across unengaged reaction plates 222 and friction plates 226 may be accomplished in the same flow pattern described with respect to the embodiments of FIGS. 1-3 and 5-6. The flapper valve may be a Belleville washer spring, so that it is internally biased in the open position.

Referring to FIG. 8, when the piston is controlled by a control unit (similar to control unit 56 of FIGS. 1-3) such that it is moved to an apply position referred to as 232', the plates 222 are engaged with the plates 226, the piston 232' closes the flapper valve 277 to block the opening 276 in the cover plate 240 so that the annular cavity 252 is sealed. Thus, radially inward cooling flow may be achieved in a similar flow path as described with respect to the embodiments of FIGS. 1-3 and 5-6 so that it flows inward across the engaged clutch plates 222, 226. Similar to the other embodiments, the pressurized fluid flows radially inward through radial openings 274, 266 and 264 formed in the respective valve body 272, fluid transfer seal member 268 and stationary member 214. From the radial opening 264, the pressurized fluid flows into the sealed annular cavity 252 and then axially through the axial passages 290 (formed via missing splined teeth in clutch plates 222). The pressurized fluid then flows radially inward across the plates 222, 226 and then out through radial openings 297 formed in a rotatable member 228 to which the friction plates 226 are splined.

Thus, the clutch assemblies described in the various alternative embodiments above enable a method of reversing cooling fluid flow across clutch plates in a transmission. Describing the method with respect to the embodiment of FIGS. 1-4, the method includes engaging the clutch plates 22, 26 and pumping fluid radially inward across the engaged clutch plates. The method further includes releasing the clutch plates 22, 26 and centrifugally pumping splashed fluid (the rotatable member 28 catches the splashed fluid) such that it flows radially outward across the released clutch plates. Preferably, the centrifugally pumping step is due to grooves 92 in the rotating clutch plates 26. The engaging step may include moving a piston 32' in one direction (i.e., toward the apply plate 20 in FIG. 3) to seal an annular cavity 52 between an apply plate cover 40 and apply plate 20. The pumping step may include pumping fluid (i.e., from the pump 38) through the sealed annular cavity 52 and radially inward across the clutch plates (friction plates 26 and reaction plates 22).

Next, the releasing step may include moving the piston 32 in an opposing direction (i.e., to the release position of FIG. 2) to open the annular cavity 52. The method may then include emptying the fluid from the open annular cavity (e.g., from an opening such as opening 76 in the apply plate cover 40 or the alternative opening 84 in the apply plate 20).

The method may also include opening a valve 60 to permit pressurized fluid flow to the annular cavity 52 when the piston 32' is moved to seal the annular cavity 52. The method also includes closing the valve 60 to prevent pressurized fluid flow (i.e., from the pump 38) to the annular cavity 52 when the piston is moved to open the annular cavity.

If the embodiment in which the apply plate 20 has the radial opening 84 is employed, the moving the piston 32' in one direction step includes sealing the apply plate cover 40 and the apply plate 20 together to block the radial opening 84. Moving the piston 32 in the opposing direction step includes unsealing the apply plate cover 40 and the apply plate 20 from one another to unblock the radial opening 84.

For alternative embodiments in which an apply plate cover has an opening, the moving the piston 32' in one direction step includes blocking the apply plate cover open and the moving the piston 32 in the opposing direction step includes unblocking the apply plate opening. These blocking and unblocking steps are illustrated in FIGS. 5 and 6 in which the opening 176 is blocked by the piston in the apply position 132' and is unblocked when the piston is in the release position 132. The blocking and unblocking steps are also illustrated by the embodiment of the clutch assembly 218 in FIGS. 7 and 8 in which the opening 276 in the cover 240 is blocked by the flapper valve 277 when the piston 232' is in the apply position and is opened when the piston 232 is in the release position to allow the flapper valve 277 to move away from the apply plate cover 240.

Referring again to the structure of FIGS. 1-4, the method of reversing fluid flow may also include providing axial passages 90 in the stationary member 14 and providing radial openings 97 in the rotatable member 28. In this instance, the pumping step also includes pumping pressurized fluid from the annular cavity 52, through the axial passages 90, across the clutch plates 22, 26 and through the rotatable member radial openings 97 (i.e., pumping the pressurized fluid radially inward).

Finally, the centrifugally pumping step (i.e., wherein the rotatable member 28 catches splashed fluid) may further include routing the splashed fluid radially outward through the rotatable member radial openings 97, across the clutch plates 22, 26, through the axial passages 90 and through the open annular cavity 52. The rotation of grooves 92 in clutch plates 26 provides the centrifugal pumping action to cause the flow.

While the best modes for carrying out the invention have been described in detail, those familiar with the art to which this invention relates will recognize various alternative designs and embodiments for practicing the invention within the scope of the appended claims.

The invention claimed is:

1. A clutch assembly for a transmission having a pressurized fluid source, comprising:
    selectively engageable clutch plates including an apply plate;
    a piston movable between an apply position and a release position to respectively engage or release said clutch plates; and
    an apply plate cover cooperating with said apply plate to at least partially define an annular cavity that is sealed to contain pressurized fluid provided from the pressurized fluid source when said piston is moved to said apply position, thereby allowing pressurized fluid flow radially inward across said engaged clutch plates, and that is opened to allow fluid to empty from said annular cavity when said piston is moved to said release position, thereby allowing centrifugally pumped fluid to flow radially outward across said released clutch plates.

2. The clutch assembly of claim 1, wherein said apply plate cover has a cover opening through which said pressurized fluid in said annular cavity is emptied when said piston is moved to said release position.

3. The clutch assembly of claim 2, wherein said piston blocks said cover opening when said piston is in said apply position and unblocks said cover opening when said piston is in said release position, thereby causing fluid to be contained in and emptied from said annular cavity, respectively.

4. The clutch assembly of claim 2, wherein said apply plate cover includes a flapper valve hinged at said cover opening; and
    wherein said flapper valve is closed by said piston to block said cover opening, thereby sealing said annular cavity to cause fluid to be contained therein when said piston is moved to said apply position, and opens to unblock said cover opening, thereby opening said annular cavity to allow fluid to be emptied therefrom when said piston is moved to said release position.

5. The clutch assembly of claim 2, wherein said cover opening is in a portion of said apply plate cover that seals against an adjacent portion of said apply plate when said piston is moved to said apply position, thereby preventing emptying of fluid through said cover opening.

6. The clutch assembly of claim 1, wherein said apply plate has an apply plate opening through which said pressurized fluid in said annular cavity is emptied when said piston is moved to said release position.

7. The clutch assembly of claim 6, wherein said apply plate cover is moved by said piston relative to said apply plate to block said apply plate opening when said piston moves to said apply position, thereby sealing said annular cavity.

8. A transmission including:
    a pressurized fluid source;
    a stationary member having a radial opening and an axial passage;
    a rotatable member having a radial opening;
    a clutch having clutch plates including reaction plates splined to said stationary member, friction plates splined to said rotatable member, and an apply plate;
    a piston movable between an apply position and a release position to respectively engage or release said clutch plates;
    an apply plate cover cooperating with said apply plate to at least partially define an annular cavity that is sealed to contain fluid from said pressurized fluid source when said piston is moved to said apply position, thereby allowing pressurized fluid flow through said stationary member radial opening, to said annular cavity, through said axial passage, and radially inward across said engaged plates; and
    said annular cavity being opened to allow centrifugally pumped fluid to flow through said rotatable member radial opening, radially outward across said released clutch plates, through said axial passage and to said annular cavity to empty therefrom.

9. The transmission of claim 8, further comprising:
    a valve controllable to open said stationary member radial opening to permit fluid flow therethrough when said piston is moved to said apply position and to block said stationary member radial opening to prevent fluid flow therethrough when said piston is moved to said release position.

10. The transmission of claim 8, wherein said apply plate cover has a cover opening; and
    wherein said piston blocks said cover opening when said piston is in said apply position and unblocks said cover opening when said piston is in said release position, thereby causing fluid to be contained in and emptied from said annular cavity, respectively.

11. The transmission of claim 8, wherein said apply plate cover has a cover opening;
    wherein said apply plate cover includes a flapper valve hinged at said cover opening; and
    wherein said flapper valve is closed by said piston to block said cover opening, thereby sealing said annular cavity to cause fluid to be contained therein when said piston is moved to said apply position, and opens to unblock said cover opening, thereby opening said annular cavity to allow fluid to be emptied therefrom when said piston is moved to said release position.

12. The transmission of claim 8,
wherein said apply plate cover has a cover opening through which said pressurized fluid in said annular cavity is emptied when said piston is moved to said release position; and
wherein said cover opening is in a portion of said apply plate cover that seals against an adjacent portion of said apply plate when said piston is moved to said apply position, thereby preventing emptying of fluid from said annular cavity through said cover opening.

13. A method of providing cooling fluid flow across clutch plates in a transmission comprising:
engaging said clutch plates; wherein said engaging includes moving a piston in one direction to thereby seal an annular cavity defined between an apply plate cover and an apply plate;
pumping fluid radially inward across said engaged clutch plates; wherein said pumping fluid radially inward includes pumping fluid through said annular cavity;
releasing said clutch plates; wherein said releasing includes moving said piston in an opposing direction to thereby open said annular cavity;
emptying said fluid from said open annular cavity; and
centrifugally pumping splashed fluid such that it flows radially outward across said released clutch plates.

14. The method of claim 13, wherein said centrifugally pumping is via grooves in rotating ones of said clutch plates.

15. The method of claim 13, wherein said transmission includes a control valve operatively connected between a pressurized fluid source and said clutch plates, the method further comprising:
opening said valve to permit pressurized fluid flow across said engaged clutch plates when said piston is moved to seal said annular cavity; and
closing said valve to prevent pressurized fluid flow across said released clutch plates when said piston is moved to open said annular cavity.

16. The method of claim 13, wherein said apply plate cover has a cover opening; wherein said moving said piston in one direction includes blocking said cover opening; and
wherein said moving said piston in an opposing direction includes unblocking said cover opening.

17. The method of claim 13, wherein said apply plate has an opening; wherein said moving said piston in one direction includes sealing said apply plate cover and said apply plate together to block said apply plate opening; and
wherein said moving said piston in an opposing direction includes unsealing said apply plate cover and said apply plate from one another to unblock said apply plate opening.

18. The method of claim 13, wherein said clutch plates include some plates splined to a stationary member and other plates splined to a rotatable member, the method further comprising:
providing an axial passage in said stationary member;
providing an opening in said rotatable member; and
wherein said pumping fluid radially inward further includes pumping fluid from said annular cavity, through said axial passage, across said clutch plates and through said rotatable member opening.

19. The method of claim 18, wherein said centrifugally pumping further includes routing splashed fluid radially outward through said rotatable member opening, across said clutch plates, through said axial passage and through said open annular cavity.

* * * * *